(12) United States Patent
Sekine

(10) Patent No.: US 12,524,487 B2
(45) Date of Patent: Jan. 13, 2026

(54) DISPLAY DEVICE DISPLAYING A KEYWORD FOR SELECTING A NEXT SLIDE DURING PRESENTATION

(71) Applicant: Interactive Solutions Inc., Tokyo (JP)

(72) Inventor: Kiyoshi Sekine, Tokyo (JP)

(73) Assignee: Interactive Solutions Inc., Tokyo (JP)

( * ) Notice: Subject to any disclaimer, the term of this patent is extended or adjusted under 35 U.S.C. 154(b) by 0 days.

(21) Appl. No.: 18/498,077

(22) Filed: Oct. 31, 2023

(65) Prior Publication Data

US 2024/0078276 A1 Mar. 7, 2024

Related U.S. Application Data

(63) Continuation of application No. 16/618,094, filed as application No. PCT/JP2018/017600 on May 7, 2018, now abandoned.

(30) Foreign Application Priority Data

Jun. 1, 2017 (JP) .................................. 2017-109340

(51) Int. Cl.
*G06F 16/9538* (2019.01)
*G10L 15/08* (2006.01)
*G10L 15/18* (2013.01)
*G10L 15/22* (2006.01)

(52) U.S. Cl.
CPC ...... *G06F 16/9538* (2019.01); *G10L 15/1815* (2013.01); *G10L 15/22* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,615,209 B1 * | 9/2003 | Gomes ................. | G06F 16/338 707/999.005 |
| 7,873,652 B1 * | 1/2011 | Hill ........................ | G06F 16/58 707/769 |
| 8,543,398 B1 * | 9/2013 | Strope .................. | G10L 15/063 704/235 |

(Continued)

*Primary Examiner* — Aleksandr Kerzhner
*Assistant Examiner* — Anugeetha Kunjithapatham
(74) *Attorney, Agent, or Firm* — Pyprus Pte Ltd; George Liu

(57) ABSTRACT

A display device comprises a voice recognition unit performing voice recognition, a conversation-derived term extraction unit extracting conversation-derived terms from conversation information derived from the voice recognitions, a search keyword storage storing the conversation-derived terms and search keyword in an associated manner, a search keyword extraction unit extracting search keywords from the search keyword storage using the conversation-derived terms, a material storage unit storing each page of a plurality of presentation materials, a search term of each page, and a score of the search term in an associated manner, a relevant page information extraction unit extracting a page of presentation material associated with the search keyword, a selection term extraction unit extracting the search keywords, and a selection term display unit causing the selection terms to be displayed on a display unit.

7 Claims, 10 Drawing Sheets

(56) References Cited

U.S. PATENT DOCUMENTS

| | | | | |
|---|---|---|---|---|
| 8,745,054 | B1* | 6/2014 | Hsu | G06F 16/34 |
| | | | | 707/750 |
| 9,449,052 | B1* | 9/2016 | Rivard | G06F 16/245 |
| 9,449,080 | B1* | 9/2016 | Zhang | G06F 16/3346 |
| 2002/0013860 | A1* | 1/2002 | Inoue | H04M 3/4936 |
| | | | | 709/246 |
| 2003/0110026 | A1* | 6/2003 | Yamamoto | G06T 13/205 |
| | | | | 704/E21.02 |
| 2004/0008828 | A1* | 1/2004 | Coles | H04M 3/4936 |
| | | | | 379/88.01 |
| 2005/0283369 | A1* | 12/2005 | Clausner | G06F 16/38 |
| | | | | 704/275 |
| 2014/0365897 | A1* | 12/2014 | Maloney | G06F 16/4393 |
| | | | | 715/731 |
| 2015/0088894 | A1* | 3/2015 | Czarlinska | G06F 16/243 |
| | | | | 707/738 |
| 2015/0379094 | A1* | 12/2015 | Ehlen | G06F 40/40 |
| | | | | 707/722 |
| 2018/0054688 | A1* | 2/2018 | Cartwright | H04S 7/30 |
| 2018/0182386 | A1* | 6/2018 | Lee | G10L 15/22 |
| 2018/0204565 | A1* | 7/2018 | Cohen | G10L 15/26 |

* cited by examiner

| ID | TERM IN MATERIAL | ID | KEYWORD | SCORE |
|---|---|---|---|---|
| TW0101 | ob/ob mouse | KW00121 | OBESITY GENE | 251 |
| | | KW00134 | OBESITY | 120 |
| | | KW02121 | OBESITY EXPERIMENTAL ANIMAL | 135 |
| TW0123 | SIMVA | KW0015 | SIMVASTATIN | 541 |
| | | KW0155 | STATIN | 99 |
| | | KW0222 | HYPERLIPEMIA TREATING AGENT | 493 |
| TW0123 | LIPOBAS | KW0015 | SIMVASTATIN | 500 |
| | | KW0155 | STATIN | 32 |
| | | KW0222 | HYPERLIPEMIA TREATING AGENT | 800 |

FIG. 6

| ID | KEYWORD | ID | TOPIC WORD | SCORE |
|---|---|---|---|---|
| KW00121 | OBESITY GENE | TW00034 | OBESITY | 251 |
|  |  | TW00401 | DIABETES | 120 |
| KW00151 | SIMVASTATIN | TW32213 | HYPERLIPIDAEMIA | 1200 |
|  |  | TW32112 | TYPE 2 DIABETES | 211 |
|  |  | TW00401 | DIABETES | 532 |
|  |  | TW40211 | SYMPTOMATIC HEART FAILURE | 21 |
|  |  | TW40212 | HEART FAILURE | 35 |
|  |  | TW00034 | OBESITY | 432 |

FIG. 7

| ID | TOPIC WORD | ID | CATEGORY WARD | SCORE |
|---|---|---|---|---|
| TW00034 | OBESITY | CW001 | MEDICINE | 100 |
|  |  | CW002 | MR | 50 |
| TW32213 | HYPERLIPIDAEMIA | CW001 | MEDICINE | 100 |
|  |  | CW002 | MR | 50 |

FIG. 8

| SELECT ALL CATEGORY | SELECT ALL TOPICS | SELECT ALL KEYWORD |
|---|---|---|
| ☑ AIPURO JYO | ☑ BLOOD PRESSURE AND RISK | ☐ PAMPHLET |
| ☐ AIPURO KAPUSERU | ☐ EFFECTIVENESS | ☐ FOR BRIEFING (BASIC) |
| ☐ AIPURO SEIRU | ☐ DRUG SELECTION | ☐ PRODUCT INFORMATION OVERVIEW |
| ☐ Interactive-Pro | ☐ SAFENESS | ☐ ATTACHED DOCUMENT·DI |
| ☐ Interactive-Pro SF | ☐ MARKET | ☐ RECORD COLLECTION |
| ☐ Interactive-Pro DB | ☐ RISK OF HIGH BLOOD PRESSURE | ☐ ACADEMIC ASSOCIATION |

| SELECT ALL TERM IN MATERIAL |
|---|
| ☑ Interactive-Pro |
| ☑ VIEWER |
| ☑ INTERACTIVE CONTENT |
| ☐ INTERACTIVE CORPORATION |
| ☑ ALGORISM DETAIL |

DISPLAY DEVICE DISPLAYING A KEYWORD FOR SELECTING A NEXT SLIDE DURING PRESENTATION

RELATED APPLICATIONS

The present invention is a continuation application of U.S. patent application Ser. No. 16/618,094 filed Nov. 27, 2019, which is a national phase application of International patent application no. PCT/JP2018/017600, filed May 7, 2018, which claims the benefit of Japanese patent application no. 2017-109340, filed Jun. 1, 2017, the disclosure of which is incorporated in its entirety.

TECHNICAL FIELD

The present invention relates to a display device for supporting conversation capable of proposing an appropriate page of presentation corresponding to conversation during conversation.

BACKGROUND ART

For example, Japanese Patent No. 4551105 discloses a conference support system using voice recognition. The voice recognition recognizes voice as text, so that it can read out an appropriate slide. Furthermore, when a slide is tried to be read out using only a term recognized by the voice recognition, the term does not necessarily match with a search term associated with the slide, failing to appropriately read out the slide.

CITATION LIST

Patent Literature

Patent Literature 1: Japanese Patent No. 4551105

SUMMARY OF INVENTION

Technical Problem

The present invention aims to provide a presentation system that effectively displays a keyword for selecting a next slide during presentation.

Solution to Problem

The present invention is basically based on a knowledge that a page candidate of presentation material associated with conversation is made to be extracted using not only a term included in conversation but also a term associated with the term to enable to appropriately propose a page candidate of presentation material associated with conversation.

The present invention relates to a display device including a computer and a mobile terminal. The display device is capable of displaying information to read out a page of presentation material associated with conversation.

The display device includes a voice recognition unit 53, a conversation-derived term extraction unit 55, a search keyword storage unit 57, a search keyword extraction unit 59, a material storage unit 61, a relevant page information extraction unit 63, a selection term extraction unit 65, and a selection term display unit 71.

The voice recognition unit 53 is an element to perform voice recognition.

The conversation-derived term extraction unit 55 is an element that extracts a plurality of conversation-derived terms from conversation information recognized by the voice recognition unit 53.

The search keyword storage unit 57 is an element for storing conversation-derived term and search keyword in an associated manner.

The search keyword extraction unit 59 is an element for extracting a plurality of search keywords from the search keyword storage unit 57 using a plurality of conversation-derived terms extracted by the conversation-derived term extraction unit 55.

The material storage unit 61 is an element for storing each page of a plurality of presentation materials, search term of each page, and score of each search term in an associated manner.

The relevant page information extraction unit 63 is an element for extracting a page of presentation material associated with search keyword from the material storage unit 59 using the search keyword extracted by the search keyword extraction unit 59 as a search term.

The selection term extraction unit 65 is an element for extracting a search keyword as a selection term for selecting a slide in a case where a page of presentation material extracted by the relevant page information extraction unit 63 exists.

The selection term display unit 71 is an element for making the display unit 69 display the selection term extracted by the selection term extraction unit 65.

The above-mentioned display device includes the above-mentioned each unit, enabling to display selection term on the display unit 69.

In the display device,
the relevant page information extraction unit 63 may extract one or a plurality of search terms having high score from the material storage unit 59 as a page of presentation material associated with search keyword using the search keyword extracted by the search keyword extraction unit 59 as search term.

In the display device,
the display unit 69 may be a display screen of a terminal, and
the selection term display unit (71) may make the selection term extracted by the selection term extraction unit (65) in a selection term display area 73 existing at a lower portion of the display screen, and
the display device may further include a selection term input unit 75 that receives information indicating that the selection term displayed is selected, and
a page candidate read out unit 77 that, using the selection term input by the selection term input unit 75, reads out a page candidate of the plurality of presentation materials associated with the selection term.

The display device may further include
a page selection information input unit 79 that receives information indicating that a specific page of presentation material is selected from among the plurality of page candidates of presentation material read out by the page candidate read out unit 77.

In this case, the display device is capable of displaying the page of presentation material selected on the display unit 69 using the information related to the page of presentation material selected by the page selection information input unit 79.

The display device preferably further includes
a search material information storage device 23 including
a term extraction unit 3 that extracts a term in material that is a term included in a certain page of material,
a keyword storage unit 5 that stores a term that becomes a keyword associated with the term in material,
a keyword extraction unit 7 that extracts a plurality of keywords that become a keyword associated with the term in material from the keyword storage unit 5 using the term in material extracted by the term extraction unit 3,
a topic word storage unit 9 that stores a topic word associated with the key word,
a topic word extraction unit 11 that, using the plurality of keywords extracted by the keyword extraction unit 7, extracts the topic word associated with the keywords from the topic word storage unit 9,
a search term candidate extraction unit 13 that extracts a candidate of search term of a certain page of the material from the topic word extracted by the topic word extraction unit 11 and the plurality of keywords extracted by the keyword extraction unit 7,
a search term candidate display unit 17 that makes a display unit 15 display the candidate of search term extracted by the search term candidate extraction unit 13,
a search term input unit 19 that receives an input indicating being a search term among candidates of search term displayed on the display unit 15, and
a material search information storage unit 21 that stores the search term input by the search term input unit 19 and information related to the certain page of the material in an associated manner.

The present invention also provides a program and a computer readable recording medium that records the program, the program causing a computer to function as the display device including
a voice recognition unit 53 that performs voice recognition,
a conversation-derived term extraction unit 55 that extracts a plurality of conversation-derived terms from conversation information recognized by the voice recognition unit 53,
a search keyword storage unit 57 that stores conversation-derived term and search keyword in an associated manner,
a search keyword extraction unit 59 that extracts a plurality of search keywords from the search keyword storage unit 57 using the plurality of conversation-derived terms extracted by the conversation-derived term extraction unit 55,
a material storage unit 61 that stores each page of a plurality of presentation materials, a search term of each page, and a score of the search term in an associated manner,
a relevant page information extraction unit 63 that, using a search keyword extracted by the search keyword extraction unit 59 as the search term, extracts a page of presentation material associated with the search keyword from the material storage unit 59,
a selection term extraction unit 65 that extracts the search keyword as a selection term for selecting a slide when the page of presentation material extracted by the relevant page information extraction unit 63 exists, and
a selection term display unit 71 that causes the selection term extracted by the selection term extraction unit 65 to be displayed on a display unit 69, whereby
the selection term is displayed on the display unit 69.

Advantageous Effects of Invention

The present invention is capable of providing a presentation system for effectively displaying a keyword for selecting a next slide during presentation.

BRIEF DESCRIPTION OF DRAWINGS

FIG. 6 is a conceptual diagram illustrating a storage example of a topic word storage unit.
FIG. 7 is a conceptual diagram illustrating a storage example of a category word storage unit.
FIG. 8 is a conceptual diagram illustrating extracted (category word), topic word, keyword, and term in material.

DESCRIPTION OF EMBODIMENT

Hereinafter, an embodiment of the present invention will be described with reference to the drawings. The present invention is not limited to the following embodiment, and also includes one appropriately modified from the following embodiment by the person skilled in the art within an obvious range.

The present invention relates to a display device including a computer and a mobile terminal. The display device is capable of displaying information to read out a page of presentation material associated with conversation.

Figure 1:
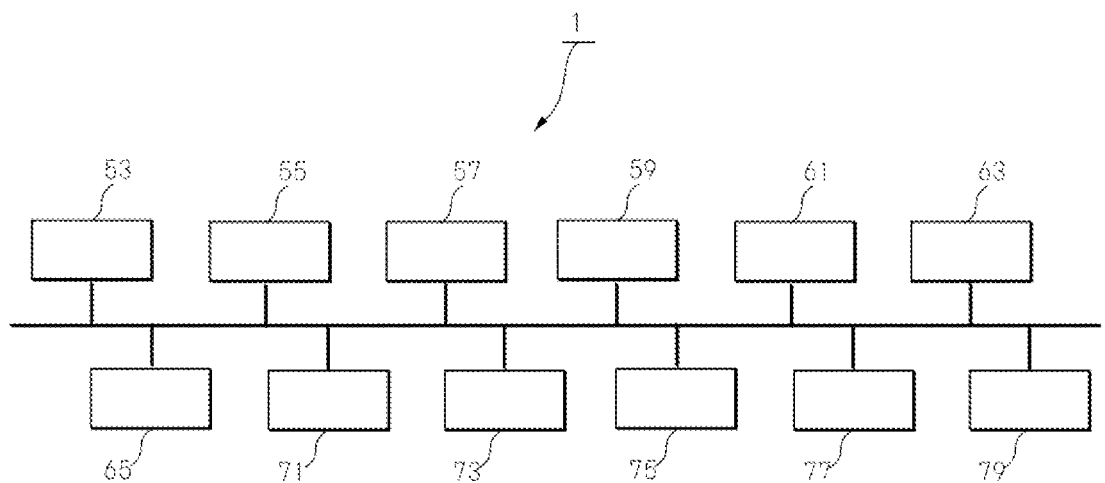
FIG. 1 is a block diagram for illustrating a display device according to the present invention.

FIG. 1 is a block diagram for illustrating a display device according to the present invention. This device is a processing device by a computer. The computer may be one of a mobile terminal, a desk-top personal computer, and a server, or a combination of two or more of them. These are typically connected by the Internet (Intranet) or the like so as to be able to transmit and receive information. Functions may be shared by using a plurality of computers, for example, by making any of the computers have some function.

Figure 2:
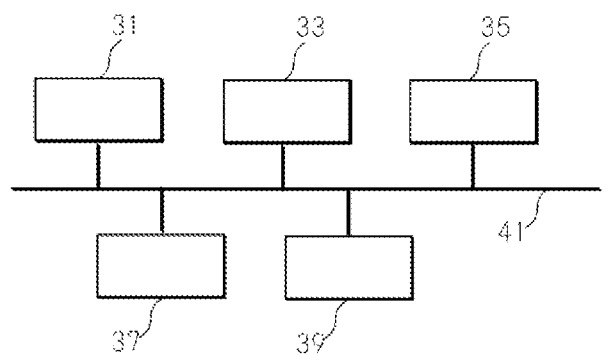
FIG. 2 is a block diagram illustrating a basic configuration of a computer.

FIG. 2 is a block diagram illustrating a basic configuration of the computer. As is described in the drawing, the computer includes an input unit 31, an output unit 33, a control unit 35, an arithmetic unit 37, and a storage unit 39, and each element is connected by a bus 41 or the like to be able to transmit and receive information. For example, a control program may be stored in the storage unit, and various kinds of information may be stored in the storage unit. When predetermined information is input from the input unit, the control unit reads out the control program stored in the storage unit. Then, the control unit appropriately reads out information stored in the storage unit and transmits the information to the arithmetic unit. The control unit also appropriately transmits input information to the arithmetic unit. The arithmetic unit performs arithmetic processing using the various kinds of information received, and an arithmetic result is stored in the storage unit. The control unit reads out the arithmetic result stored in the storage unit and output it from the output unit. In this manner, various kinds of processing are executed. The various kinds of processing are executed by each unit.

Figure 3:
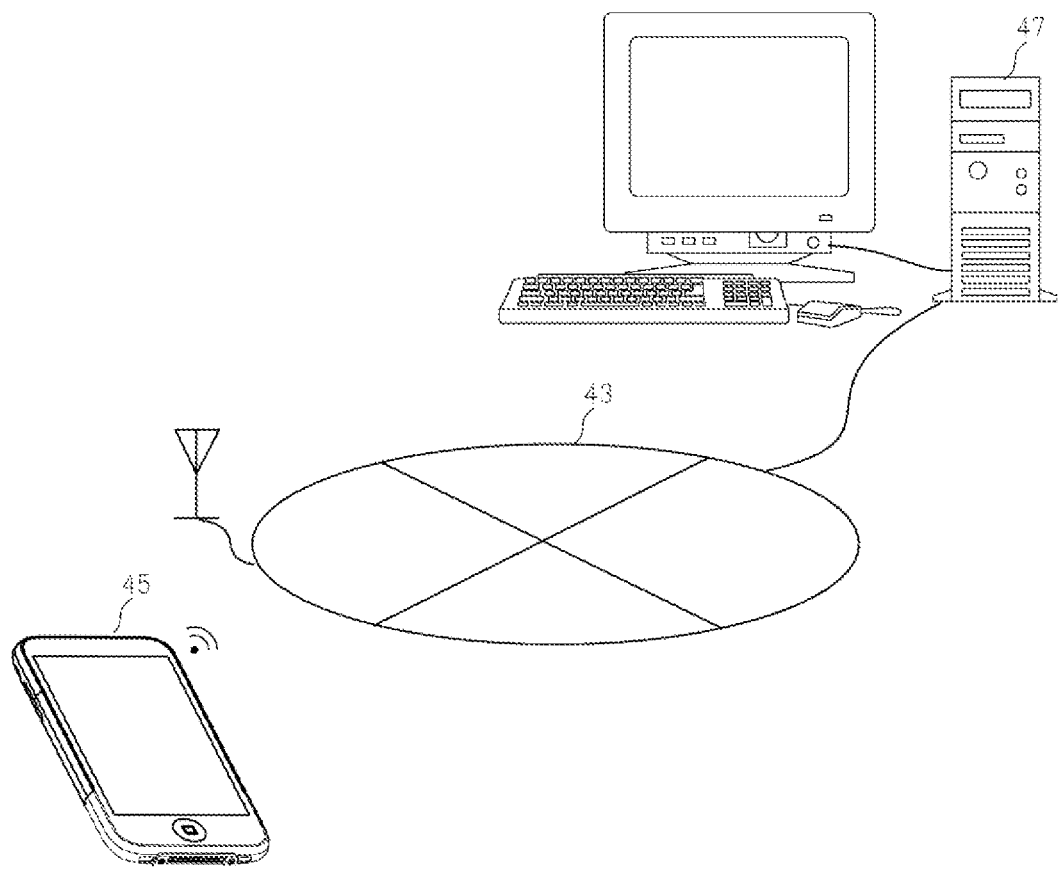
FIG. 3 is a conceptual diagram illustrating a system example of the present invention.

FIG. 3 is a conceptual diagram illustrating a system example according to the present invention. As illustrated in FIG. 3, the system (system including the device of the present invention) according to the present invention may include a mobile terminal 45 connected to the Internet or an intranet 43, and a server 47 connected to the Internet or the Intranet 43. Of course, a single computer or mobile terminal may function as the device of the present invention, or a plurality of servers may exist.

A monitor or a display of the mobile terminal 45 may function as a display unit 69.

As illustrated in FIG. 1, the display device (device according to the present invention) includes a voice recognition unit 53, a conversation-derived term extraction unit 55, a search keyword storage unit 57, a search keyword extraction unit 59, a material storage unit 61, a relevant page information extraction unit 63, a selection term extraction unit 65, and a selection term display unit 71.

The voice recognition unit 53 is an element to perform voice recognition. Voice recognition is known. In order to perform voice recognition, a microphone for collecting voice and a voice analyzation unit for analyzing the voice input from the microphone are typically included. Voice recognition itself is known as described in Japanese Patent No. 6127422, Japanese Patent No. 6114210, and Japanese Patent No. 6107003 besides Japanese Patent No. 4551105 (Patent Literature 1). The voice recognition unit 53 enables to input voice included in conversation in the device as an input to store a term included in the conversation as data. The voice recognition unit 53 appropriately stores a term included in conversation in the storage unit. In this context, the voice recognition unit 53 may store a term as well as information related to volume or change in volume.

The conversation-derived term extraction unit 55 is an element that extracts a plurality of conversation-derived terms from conversation information recognized by the voice recognition unit 53. As described above, a term included in conversation is appropriately stored in the storage unit. The storage unit also stores a term capable of being used for search. The term may be, for example, noun. Also, for example, the storage unit may include a term extraction database storing term for term extraction to extract the term included in conversation in accordance with usage such as medical use or bank use. In this case, the conversation-derived term extraction unit 55 is sufficient to read out a term for term extraction with reference to the term extraction database, and determine whether the term for extracting term matches with a conversation-derived term stored in the storage unit. Then, the term for term extraction is sufficient to be stored in the storage unit as a "conversation-derived term" in a case where there is a conversation-derived term that matches with the term for term extraction. In this context, information related to appearance frequency of "conversation-derived term" and volume or change in volume in conversation during a predetermined period may be stored together in the storage unit. The term extraction database may also store a score indicating probability of becoming a search term for each term together with the term for term extraction. In this case, the conversation-derived term extraction unit 55 may extract a candidate of "conversation-derived term" using any one or more of "conversation-derived term" having a high score, "conversation-derived term" having a high frequency, "conversation-derived term" changed in volume (increased in volume), score, frequency, and change in volume as an index. Also, as to the above-mentioned each element, for example, coefficients may be stored for the above-mentioned respective elements to obtain score of conversation-derived term by multiplying the various coefficients. For example, when the coefficient is 1, no change occurs in the score. In contrast, when volume is largely increased, score of conversation-derived term can be adjusted by allocating the coefficient to be from 1.1 to 1.9 depending on degree of the change.

The search keyword storage unit 57 is an element for storing conversation-derived term and search keyword in an associated manner. The conversation-derived term is basically term assumed to be included in conversation (e.g., conversation between salesman and customer). In contrast, there is a discrepancy between the term assumed to be included in conversation and the term that is suitable to be used for search. A difference between so called spoken word and written word is also one of the discrepancies. Accordingly, in the present invention the search keyword storage unit 57 stores conversation-derived term and search keyword in an associated manner and converts into search keyword suited for search.

The search keyword storage unit 57 may be achieved by the storage unit (storage device), or achieved by a database and a database management system. The storage device stores search keyword corresponding to conversation-derived term for a plurality of conversation-derived terms. The storage device may also record a score used for search in association with search keyword.

Examples of conversation-derived terms are "losing weight", "thin", "slim", and examples of search keywords corresponding to them are "sliming" "fatness", body shape", "physical examination".

The search keyword extraction unit 59 is an element for extracting a plurality of search keywords from the search keyword storage unit 57 using a plurality of conversation-derived terms extracted by the conversation-derived term extraction unit 55. The search keyword extraction unit 59 extracts search keyword stored in association with conversation-derived term in the search keyword storage unit 57 for each of the plurality of conversation-derived terms. In this context, the search keyword extraction unit 59 may extract the score stored with the search keyword. The search keyword extraction unit 59 stores the search keyword (and score) extracted in the storage unit. In addition, the search keyword (and score) is extracted from the search keyword storage unit 57 for every (or a predetermined number of) conversation-derived term to store them in the storage unit. The search keyword extraction unit 59 extracts a search keyword using the search keyword (and its score) temporally stored in the storage unit. In this context, the search keyword extraction unit 59 may extract a search keyword having a high score. The search keyword extraction unit 59 stores the search keyword extracted in the storage unit. In this context, the search keyword extraction unit 59 may store a plurality of search keywords together with scores of the respective search keywords.

The material storage unit 61 is an element for storing each page of a plurality of presentation materials, search term of each page, and score of each search term in an associated manner.

The relevant page information extraction unit 63 is an element for extracting a page of presentation material associated with search keyword from the material storage unit 59 using the search keyword extracted by the search keyword extraction unit 59 as a search term. Each page of presentation material associated with search term is stored in the material storage unit 61 (together with, for example, score and ranking).

The relevant page information extraction unit 63 obtains information for extracting each page of presentation material having high score or ranking from the material storage unit 61 using search keyword.

The relevant page information extraction unit 63 may extract one or a plurality of search terms having high score from the material storage unit 59 as a page of presentation material associated with search keyword using the search keyword extracted by the search keyword extraction unit 59 as search term.

The selection term extraction unit 65 is an element for extracting a search keyword as a selection term for selecting a slide in a case where a page of presentation material extracted by the relevant page information extraction unit 63 exists. The selection term may be one or plural. Also, the number of search terms may be a predetermined number, for example, three, four, five, or six. The number of search terms may be determined using size of an area of the display unit in which selection term is displayed, font size of selection term, and the number or characters of selection term. In this case, for example, the selection term extraction unit 65 obtains information related to the length of the area in which selection term is displayed. Next, the selection term extraction unit 65 obtains information related to size of character at a portion where selection term is displayed in the display unit. The selection term extraction unit 65 obtains information related to a size other than the size per one-character portion in a case where selection term is displayed. In addition, the selection term extraction unit 65 extracts a selection term having a high priority one by one for the reason of, for example, high score or ranking, obtains a length of the selection term portion displayed on the display unit when selection terms are displayed, for example, when one, two, three, four, five, six selection terms are displayed, and compares the length of the selection term portion and the length of the portion where selection terms are displayed. Then, when the length of the selection term portion is shorter than the display portion, one selection term is added. In this manner, the selection term extraction unit 65 can extract the appropriate number of selection terms.

The selection term display unit 71 is an element for making the display unit 69 display the selection term extracted by the selection term extraction unit 65.

The above-mentioned display device includes the above-mentioned each unit, enabling to display selection term on the display unit 69.

Figure 13:
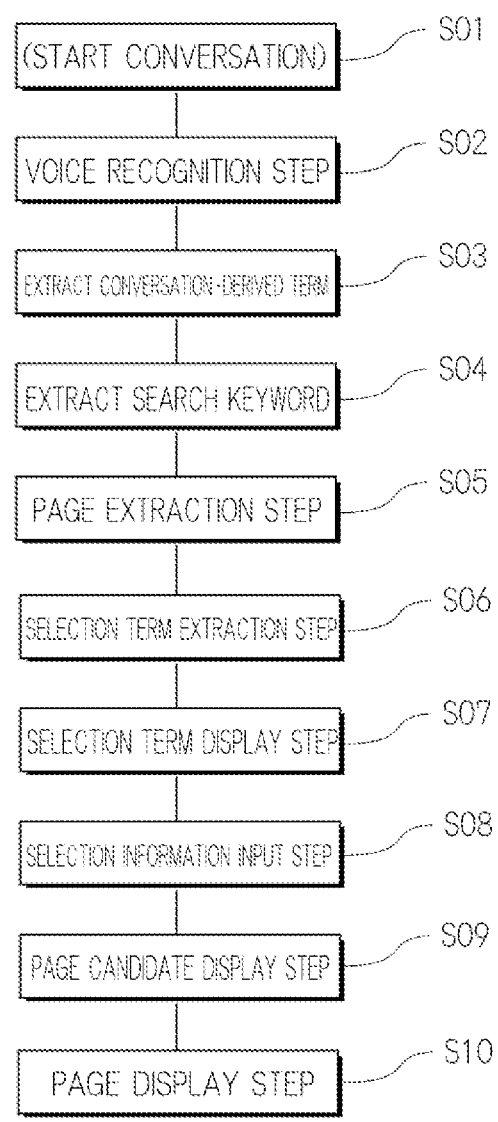
FIG. 13 is a flowchart for illustrating an example of a step of displaying a selection term and a step of displaying a page of presentation material associated with the selection term.

FIG. 13 is a flowchart for illustrating an example of a process of displaying selection term and a process of displaying the page of presentation material associated with the selected term. S denotes step.

A person in charge possessing the above-mentioned display device performs conversation with a customer (start conversation: S01).

Then, the voice recognition unit 53 voice-recognizes information related to the conversation including a term including in the conversation (voice recognition step: S02). The information (including term) related to the conversation voice-recognized is appropriately stored in the storage unit. Note that the display device may store a coefficient corresponding to a change of voice such as frequency of term in a predetermined time, increase or decrease of volume in a case where a certain term is uttered, or change of wavelength of voice to read out the predetermined coefficient in association with the term in a case where the information related to the conversation is analyzed.

The conversation-derived term extraction unit 55 appropriately reads out the information related to the conversation recognized by the voice recognition unit 53 from the storage unit, and extracts a plurality of conversation-derived terms using the information read out (conversation-derived term extraction step: S03). Since including a database related to conversation-derived term, the display device can select noun or an effective term for search from among the terms included in the conversation by referencing to the database. In this manner, a conversation-derived term is extracted. As to conversation-derived term, a score of the conversation-derived term may be stored in association with the conversation-derived term in consideration of possibility of being used for search.

The search keyword storage unit 57 stores conversation-derived term and search keyword in an associated manner. In this context, a score of the search keyword may be stored in association with the search keyword in consideration of possibility of being used for search. The search keyword extraction unit 59 extracts a plurality of search keywords from the search keyword storage unit 57 using the pluralities of conversation-derived terms extracted by the conversation-derived term extraction unit 55 (by appropriately reading out from the storage unit) (search keyword extraction step: S04). In this manner, search is performed using not conversation-derived term (there is a case where conversation-derived term is search keyword as it is), but search keyword converted from conversation-derived term, making it possible to search an appropriate page of presentation material.

The material storage unit 61 stores each page of a plurality of presentation materials, search term of each page, and score of each search term in an associated manner. Then, using the search keyword extracted by the search keyword extraction unit 59 as a search term, the relevant page information extraction unit 63 extracts a page of presentation material associated with the search keyword from the material storage unit 59 (page extraction step: S05). The page of presentation material need not be displayed in this stage, and one or a plurality of related pages of presentation material is sufficient to exist and information for reading out the related pages (e.g., information related to material ID and the number of pages) is sufficient to be read out. The information for reading out associated page extracted is appropriately stored in the storage unit. The relevant page information extraction unit 63 may extract one or a plurality of search terms having high score from the material storage unit 61 as a page of presentation material associated with search keyword using the search keyword extracted by the search keyword extraction unit 59 as search term.

Next, the selection term extraction unit 65 determines whether page of presentation material extracted by the relevant page information extraction unit 63 exists, and when determined that page exists, the selection term extraction unit 65 extracts a search keyword as a selection term to make a slide be selected (selection term extraction step: S06). Note that the search keyword may be extracted as a selection term as it is. Then, the selection term extracted is appropriately stored in the storage unit.

Figure 14:
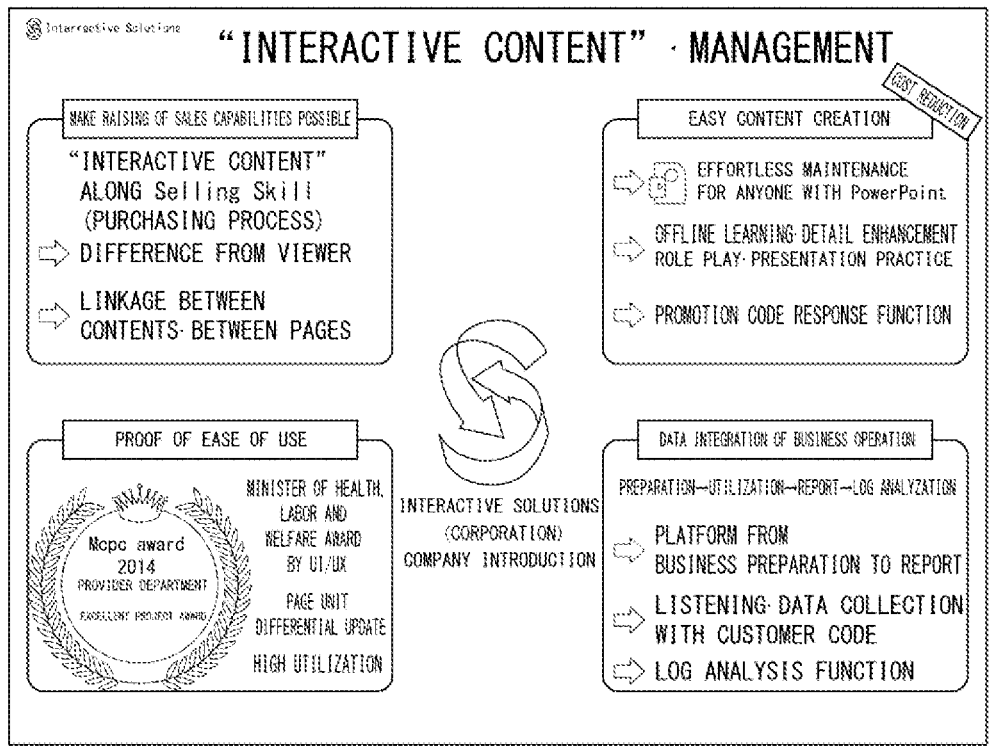
FIG. 14 is a conceptual diagram illustrating a display example of a display unit before displaying a selection term.
Figure 15:
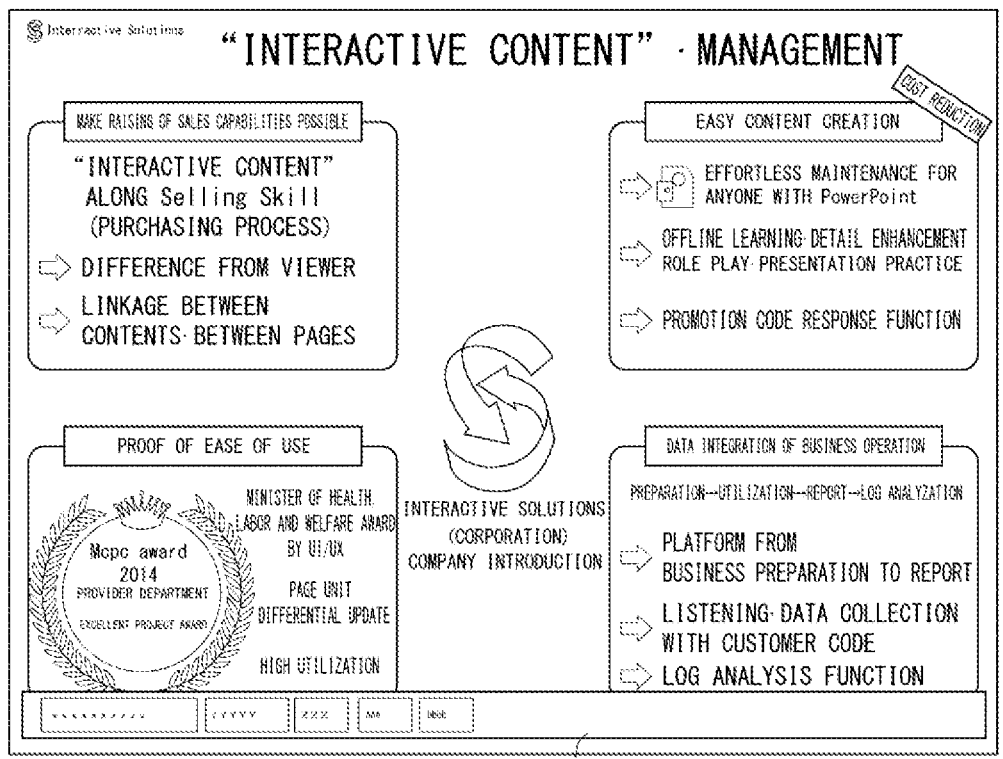
FIG. 15 is a conceptual diagram illustrating a display example of the display unit in a case where a selection term is displayed.

The selection term display unit 71 (appropriately reads out the selection term extracted by the selection term extraction unit 65 from the storage unit and) makes the display unit 69 display the selection term extracted by the selection term extraction unit 65 (selection term display step: S07). FIG. 14 is a conceptual diagram illustrating a display example of the display unit before displaying selection term. In contrast, FIG. 15 is a conceptual diagram illustrating a display example of the display unit in a case where selection term is displayed. In this example, selection terms are displayed in a selection term display area 73 existing at a lower portion of a display screen. In the example of FIG. 15, the display unit is of a touch panel type, and a plurality of selection terms (five selection terms in the example) are display area in the selection term display area 73. In this manner, selection term is to be displayed on the display unit.

For example, any of the selection terms displayed on the touch panel is touched by a person in charge (user) (or a selection term is selected in a state where a cursor is moved by a mouse or the like in a case where the display unit is a monitor of desk-top computer). A selection term input unit 75 inputs information indicating that a specific selection term is selected in the display device, and the display device receives the input information (selection information input step: S08). The information related to the specific selection term input is appropriately stored in the storage unit.

Figure 16:
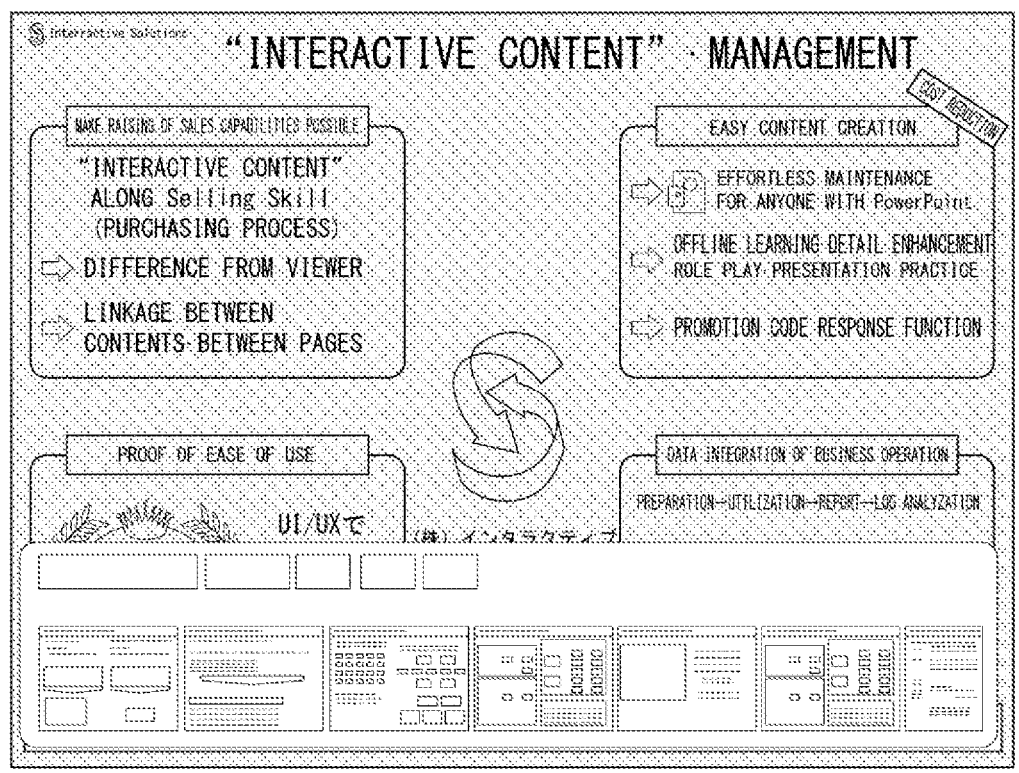
FIG. 16 is a conceptual diagram illustrating a state where a page candidate is displayed on the display unit.

A page candidate read out unit 77 reads outs information related to a page candidate of the plurality of presentation materials related to selection term using the selection term (by appropriately reading out the selection term from the storage unit) input by the selection term input unit 75. A reduced screen for page candidate is created using the read-out information and the reduced screen is displayed on the display unit (page candidate display step: S09). FIG. 16 is a conceptual diagram illustrating a state where page candidates are displayed on the display unit. In the example illustrated in FIG. 16, when there is a plurality of page candidates of the plurality of presentation materials read out, a lower portion of the selection term display area 73 or the selection term display area 73 may be moved on an upper direction, and the plurality of page candidates of presentation material made small in their size may be displayed in an aligned manner. Note that the page candidate display step may be omitted.

When the display unit is a touch panel, a person in charge (user) presses an upper portion of a page candidate iconified. This makes the display device determine that a specific candidate is selected. That is, a page selection information input unit 79 receives information indicating that a specific page of presentation material is selected from among the plurality of page candidates of presentation material read out by the page candidate read out unit 77. The information received is input to the display device. The information input (information indicating that a specific page is selected, or information related to specified page) is appropriately stored in the storage unit. In this case, the display device makes the page of presentation material selected be displayed on the display unit 69 using the information related to the page of presentation material selected by the page selection information input unit 79 (by appropriately reading out the information from the storage unit unit) (page display step: S10).

The display device preferably further includes
a search material information storage device 23 including
a term extraction unit 3 that extracts a term in material that is a term included in a certain page of material,
a keyword storage unit 5 that stores a term that becomes a keyword associated with the term in material,
a keyword extraction unit 7 that extracts a plurality of keywords that become a keyword associated with the term in material from the keyword storage unit 5 using the term in material extracted by the term extraction unit 3,
a topic word storage unit 9 that stores a topic word associated with the key word,
a topic word extraction unit 11 that, using the plurality of keywords extracted by the keyword extraction unit 7, extracts the topic word associated with the keywords from the topic word storage unit 9,
a search term candidate extraction unit 13 that extracts a candidate of search term of a certain page of the material from the topic word extracted by the topic word extraction unit 11 and the plurality of keywords extracted by the keyword extraction unit 7,
a search term candidate display unit 17 that makes a display unit 15 display the candidate of search term extracted by the search term candidate extraction unit 13,
a search term input unit 19 that receives an input indicating being a search term among candidates of search term displayed on the display unit 15, and
a material search information storage unit 21 that stores the search term input by the search term input unit 19 and information related to the certain page of the material in an associated manner.

Figure 12:
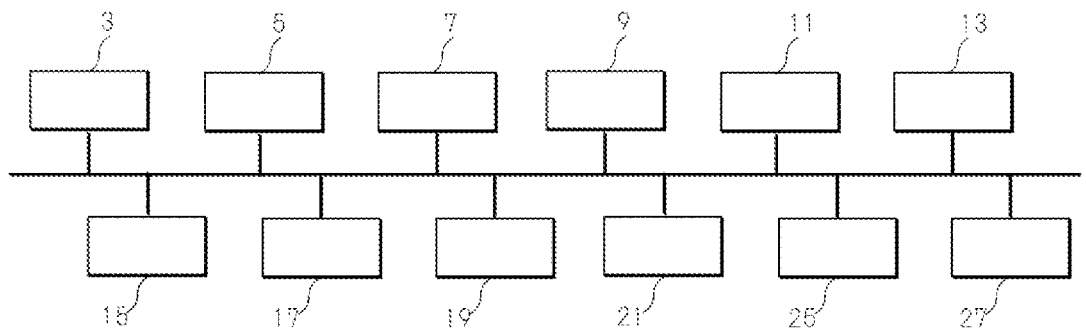
FIG. 12 is a block diagram for illustrating the search material information storage device according to the present invention.

As illustrated in FIG. 12, the search material information storage device includes the term extraction unit 3, the keyword storage unit 5, the keyword extraction unit 7, the topic word storage unit 9, the topic word extraction unit 11, the search term candidate extraction unit 13, the search term candidate display unit 17, the search term input unit 19, and the material search information storage unit 21. Each unit is a unit by a computer, and achieves each processing by collaboration between hardware and software.

The term extraction unit 3 is a unit for extracting term in material that is term included in a certain page of material. An example of material is so called a presentation material. Format of the presentation material is not specifically limited. Examples of presentation software include Microsoft (registered trademark), PowerPoint (registered trademark), KINGSOFT (registered trademark) KINGSOFT Office (registered trademark), Apache (registered trademark), OpenOffice Impress (registered trademark), Keynote (registered trademark), Lotus•Freelance (registered trademark), Illustrator (registered trademark), PDF (registered trademark), and Prezi (registered trademark). An example of material is, for example, a material created by any of the presentation software. The presentation software is software capable of displaying content for each page on, for example, the display unit such as a screen.

Figures 4, 5:
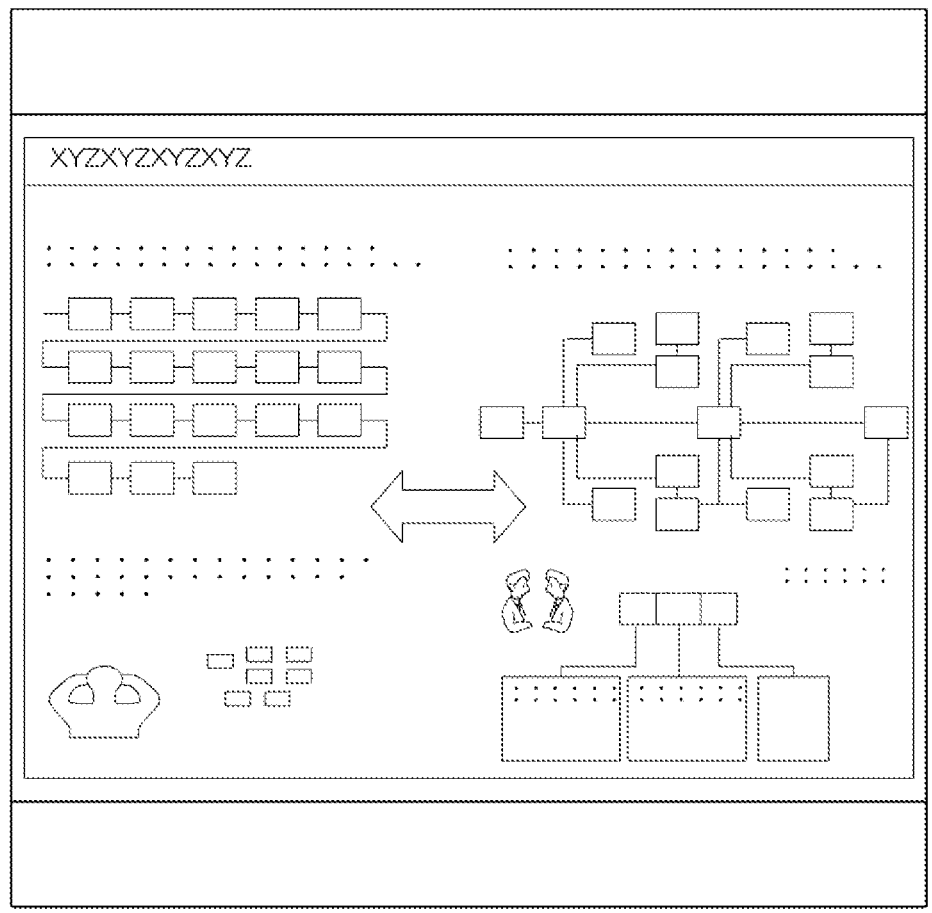
FIG. 4 is an example of a certain page of presentation material.
FIG. 5 is a conceptual diagram illustrating a storage example of a keyword storage unit.

FIG. 4 is an example of a certain page of presentation material. As illustrated in FIG. 4, the presentation material includes a plurality of texts input by a creator. The user can view a plurality of characters. In contrast, the computer stores information such as text input by the user and input information related to the text (size of character, color of character, presence or absence of animation) with the text. A preferable example of the term extraction unit 3 is to apply evaluation (score) of a text in accordance with input information related to the text (size of character, color of character, presence or absence of animation) when the text is extracted. For example, a possibility of indicating the content of presentation material becomes higher as character becomes larger, so that high score is applied. For example, in a case where character is reddish color or in a case where animation is attached to text, the character or the text often indicates a content of the presentation material, so that high score is applied. The term extraction unit 3 is sufficient to store evaluation (score) of effect associated with the text, read out the evaluation as a text related score when term is extracted, and add it to or multiply it to another score for evaluation when a score described below is calculated.

In contrast, the term extraction unit 3 itself is known. The presentation material includes a plurality of kinds of text information. The presentation material is stored in, for example, the server storage unit or the storage unit (in the computer). The term extraction unit 3 reads out each page of presentation material stored, and reads out text included in each page. Then, the term extraction unit 3 subjects the text read out to word class analyzation. In this context, for example, a word class database exists in the storage unit, and various terms and their word classes are stored therein. In this context, score as search term of various terms may be also stored together in the storage unit in accordance with usage. For example, when the search material information storage device is for pharmaceutical manufacturers, MR (medical representative), or MS (pharmaceutical wholesale), a high score may be assigned to various disease names as compared with general noun. Also, a high score higher may be assigned to various drug names and active ingredients as compared with general noun although the score is lower than that of disease names. The term extraction unit 3 is sufficient to extract term (noun in particular) included in text to extract one or a plurality of terms in material using its frequency or the score of the term stored in the storage unit. For example, when the term extraction unit 3 extracts term A, term B, and term C from a certain page, the term C is appeared by two times, the term A and term B are appeared by one time, and scores of the terms A, B, and C stored in the storage unit are respectively 5, 50, and 40, scores of the term A, B, and C are sufficient to be respectively determined to be 5, 50, and 80. For example, when the number of extractions of term in material is set to 2, the term extraction unit 3 is sufficient to extract the terms C and B as terms in material. The terms in material (terms C and B) extracted are stored in the storage unit in association with the information related to page that allows to read out the page. This enables to read out the terms C and B with their pages. Another example of the term extraction unit 3 is one that identifies a portion where the largest font is used in a certain page of presentation. The term extraction unit 3 applies a predetermined coefficient to a term in material included in the portion where the largest font is used. The coefficient (first coefficient: $a_1$) is sufficient to be stored in the storage unit. The term extraction unit 3 stores the first coefficient in the storage unit together with the term in material included in the portion where the largest font is used. The term extraction unit 3 may also store a coefficient (second coefficient: $a_2$) that depends on the size of font together with the term in material in the storage unit.

The keyword storage unit 5 is a unit to store term that becomes a keyword associated with the term in material. The keyword storage unit 5 is sufficient to be provided by a storage unit and an element for reading out information from the storage unit (e.g., control program). The keyword is a term to make search of each page easy by using not only a plurality of terms in material but also a term associated therewith as a search term when each page is searched. This reduces search terms stored in association with each page, enabling quick search. In some cases, a term in material may be a keyword as it is. The keyword can be regarded as a first conversion word related to term in material. The keyword may be a term suitable to be used for search selected from a plurality of kinds of terms in material.

The term in material is a term included in presentation. Accordingly, in some cases, the term in material does not match with search term or is not suitable as search term. For example, a term of ob gene and ob/ob mouse is supposed to be included in presentation. The terms are associated with obesity gene (and obesity, obesity experimental animal). Accordingly, the keyword storage unit 5 stores, in association with ob gene and ob/ob mouse that are terms in material, obesity gene (and obesity, obesity experimental animal) that is their keyword.

Because of presence of the keyword storage unit 5, search term stored in association with each page becomes a unified term. This makes it possible to quickly read out an associated page in search.

FIG. 5 is a conceptual diagram illustrating a storage example of the keyword storage unit. As illustrated in FIG. 5, the keyword storage unit stores one or a plurality of keywords for each of a plurality of terms in material in an associated manner, and stores scores (this score is referred to as $b_1$) of the respective keywords in an associated manner. The scores are preferably preliminarily input such that the score becomes higher as the keyword becomes more suitable as a term used for search.

The keyword extraction unit 7 is a unit for, using a term in material extracted by the term extraction unit 3, extracting words that become a plurality of keywords associated with the term in material from the keyword storage unit 5. The keyword storage unit 5 stores a term that becomes a keyword in association with the term in material. This enables the keyword extraction unit 7 to read out a term that becomes a keyword associated with the term in material from the keyword storage unit 5 using the term in material. Typically, a plurality of terms in material is extracted from a certain page. Accordingly, a term that becomes a keyword for a certain page is typically extracted by a plurality of times. Also, the number of terms that become a keyword associated with term in material is also plural typically (score may be assigned to each of the terms). Accordingly, a term that becomes a keyword for a certain page is typically extracted by a plurality of times. Note that a case may occur where a term in material is a term that becomes a keyword. That is, a term in material may be extracted as a keyword as it is. The keyword extraction unit 7 may evaluate the score of each of the keywords using the coefficient of term in material and the score of keyword stored in the storage unit. An example of score of keyword is $a_1 \times a_2 \times b_1$. In order to calculate the score, a control program for performing the above-mentioned calculation is stored in the storage unit, so that the control unit is sufficient to read out the control program, read out each coefficient and score stored in the storage unit, make the arithmetic unit perform calculation for obtaining $a_1 \times a_2 \times b_1$, and make the storage unit store a calculation result. Also, appearance frequency of term in material (this coefficient is referred to as $a_{21}$) and an addition coefficient in a case where a specific keyword is extracted from among a plurality of types of terms in material (this coefficient is referred to as azz) may be made to be stored in the storage unit, and a score of keyword may be obtained by obtaining $a_1 \times a_2 \times a_{21} \times a_{22} \times b_1$ to store the score in the storage unit. Besides, a strong coefficient may be applied for an emphasis color included in a certain page. In this case, the keyword extraction unit 7 is sufficient to include a unit for analyzing color of term from page, and a storage unit for storing a coefficient for each color, and read out the coefficient related to the color from the storage unit using the color of term analyzed. It is sufficient that coefficient and score are stored for various elements for not only keyword but also topic word and category word in the same manner basically, the coefficient and score are read out, a score is obtained by multiplication, addition, or the like, the score of each word is stored for comparison to obtain a leading candidate.

The topic word storage unit 9 is a unit that stores a topic word associated with a keyword. The topic word storage unit 9 is sufficient to be provided by a storage unit and an element (e.g., control program) for reading out information from the storage unit.

For example, the topic word storage unit is sufficient to store a topic word such as obesity in association with a keyword such as obesity gene, obesity, or obesity experimental animal). The topic word may be a term that further unifies a plurality of keywords or a term made to be a superordinate concept. Using the topic word enables quick search. Examples of topic word include disease name, drug name, active ingredient name, and pharmaceutical company name. That is, the topic word can be regarded as a second conversion word related to term in material. The topic word may be a term obtained by assigning a term suitable to be used for search for a plurality of kinds of keywords. Also, the topic word may be related to message.

The topic word extraction unit 11 is a unit for extracting a topic word associated with a keyword from the topic word storage unit 9 using a plurality of keywords extracted by the keyword extraction unit 7.

A topic word associated with a keyword is stored in the topic word storage unit 9. Accordingly, the topic word extraction unit 11 extracts a topic word associated with a keyword from the topic word storage unit 9 using the plurality of keywords extracted by the keyword extraction unit 7.

FIG. 6 is a conceptual diagram illustrating a storage example of the topic word storage unit. As illustrated in FIG. 6, the topic word storage unit stores one or a plurality of topic words for each of a plurality of keywords in an associated manner, and stores a score of each of the topic words in an associated manner. The scores are preferably preliminarily input such that the score becomes higher as the keyword becomes more suitable as a term used for search.

The search term candidate extraction unit 13 is a unit for extracting a candidate of search term of a certain page of material from among the topic word extracted by the topic word extraction unit 11 and the plurality of keywords extracted by the keyword extraction unit 7.

For example, one or a plurality of topic words supposed to be associated with a certain page are stored in the storage unit. Also, a plurality of keywords supposed to be associated with a certain page is stored.

When the control program controls to determine, for example, every topic word as a candidate of search term and determine several keywords (e.g., four keywords in consideration of size to be displayed on the display unit) as candidates of search term, the search term candidate extraction unit 13 determines every topic word read out as a candidate of search term and determines the four keywords as candidates of search term.

Note that the keyword storage unit 5 may store a plurality of keywords and scores or the respective keywords in an associated manner and the keyword extraction unit 7 may extract the scores of the respective keywords with the plurality of keywords. In this case, for example, a keyword having a high score is extracted as a candidate of search term.

The topic word storage unit 9 may store topic words and scores of the respective topic words in an associated manner, and the topic word extraction unit 11 may determine a predetermined number (one or two or more) of keywords having high score from among the plurality of keywords extracted by the keyword extraction unit 7 as topic word leading candidates to extract a topic word associated with the predetermined number (one or two or more) of topic ward leading candidates from the topic word storage unit 9.

The above-mentioned search material information storage device may further include
a category word storage unit 25 and a category word extraction unit 27.

The category word storage unit 25 is a unit for storing category word associated with topic word.

The category word extraction unit 27 is a unit for extracting category word associated with topic word from the category word storage unit 25 using the topic word extracted by the topic word extraction unit 11. The category word can be regarded as a third conversion word related to term in material. The category word may be a selected term suitable to be used for category search for a plurality of kinds of topic words. An example of category word may be one that indicates a target probably having an interest in material. For example, when a certain page of material is of a certain drug for diabetes for the MR (the drug is, for example, sufficient to be stored in association with topic word), examples of category words may be "MR", "diabetes", "medicine". Alternatively, when a certain page of material is of accounting information for banker of bank, examples of category word may be banker or may be "banker" and "accounting". Still alternatively, category word may be information related to product. The search term candidate display unit 17 of the search material information storage device further extracts the category word extracted by the category word extraction unit 27 as one candidate of search term. FIG. 7 is a conceptual diagram for illustrating a storage example of the category word storage unit. The category word storage unit stores one or a plurality of category words for each of a plurality of topic words in an associated manner, and stores scores of the respective category words in an associated manner. The scores are preferably preliminarily input such that the score becomes higher as the keyword becomes more suitable as a term used for search.

FIG. 8 is a conceptual diagram illustrating (category word), topic word, keyword, and term in material, which are extracted.

The search term candidate extraction unit 13 may extract a predetermined number (one or two or more) of keywords having high score from among the plurality of keywords extracted by the keyword extraction unit 7 as candidates of search term. Alternatively, the search term candidate extraction unit 13 may extract a predetermined number (one or two or more) of topic words from among the topic wards extracted by the topic word extraction unit 11 using score of keyword and score of topic word as candidates of search term. For example, the topic word storage unit 9 stores topic words and scores or the respective topic words in an associated manner. Also, the keyword storage unit 5 stores a plurality of keywords and scores of the respective keywords in an associated manner. An original keyword exists for a certain topic word. That is, topic word is one read out using keyword. Topic word results in being constantly associated with one or a plurality of keywords. In this case, the search term candidate extraction unit 13 reads out the scorer related to a certain topic word from the topic word storage unit 9 as well as reads out scores of respective keywords that become extraction originates of the topic word from the keyword storage unit 5. Then, when a plurality of keywords exists for a certain topic word, the search term candidate extraction unit 13 makes the arithmetic unit sum scores of respective keywords as well as multiplies the score of topic word by the score of keyword (or total score of keywords). In this manner, tallied score related to topic word is obtained to make the storage unit store the tallied score. The search term candidate extraction unit 13 reads out the tallied score for a plurality of topic words and makes the arithmetic unit compare the tallied scores to extract a predetermined number (one or two or more) of topic words. In this manner, the search term candidate extraction unit 13 can extract a predetermined number of topic words even when the number of topic words to be extracted is determined.

The search term candidate display unit 17 is a unit for making the display unit 15 display a candidate of search term extracted by the search term candidate extraction unit 13.

The search term candidate display unit 17 may make the display unit 15 display, as candidates of search term, a predetermined number of (one or two or more) keywords extracted as candidates of search term and a predetermined number of (one or two or more) topic words extracted as candidates of search term, as well as a keyword not extracted as a candidate of search term among the plurality of keywords extracted by the keyword extraction unit 7 and a topic word not extracted as a candidate of search term among topic words extracted by the topic word extraction unit 11 as preliminary candidates of search term, and when the search term input unit 19 receives an input indicating that one of the preliminary candidates of search term is determined as a search term, may determine the one of the preliminary candidates of search term as a search term, and may determine the candidates of search term as search terms except for one of the candidates for which an input indicating not a search term is received.

The material search information storage unit 21 is a unit for storing the search term input by the search term input unit 19 and information related to a certain page of material in an associated manner.

The device of the present invention may be one that further displays a candidate of content type in accordance with a kind of presentation material and stores the content type in association with each page of presentation (or presentation itself). In this case, the device of the present invention reads out format of presentation (Power Point (registered trademark), PDF (registered trademark), Word (registered trademark), or the like) stored in the storage unit. The device of the present invention reads out text included in the format read out. The device of the present invention includes a term database for analyzing content storing term for analyzing content. The device of the present invention analyzes type of content using the term stored in the term database for analyzing content. For example, when material is of PDF (registered trademark), and a text named "attached document" exists at a relatively early stage, "attached document" is extracted as a candidate of content type of the material. Then, when "attached document" is displayed as content type on the display unit and an authentication in input by the user, "attached document" related to content type is stored in association with the material.

Figure 9:
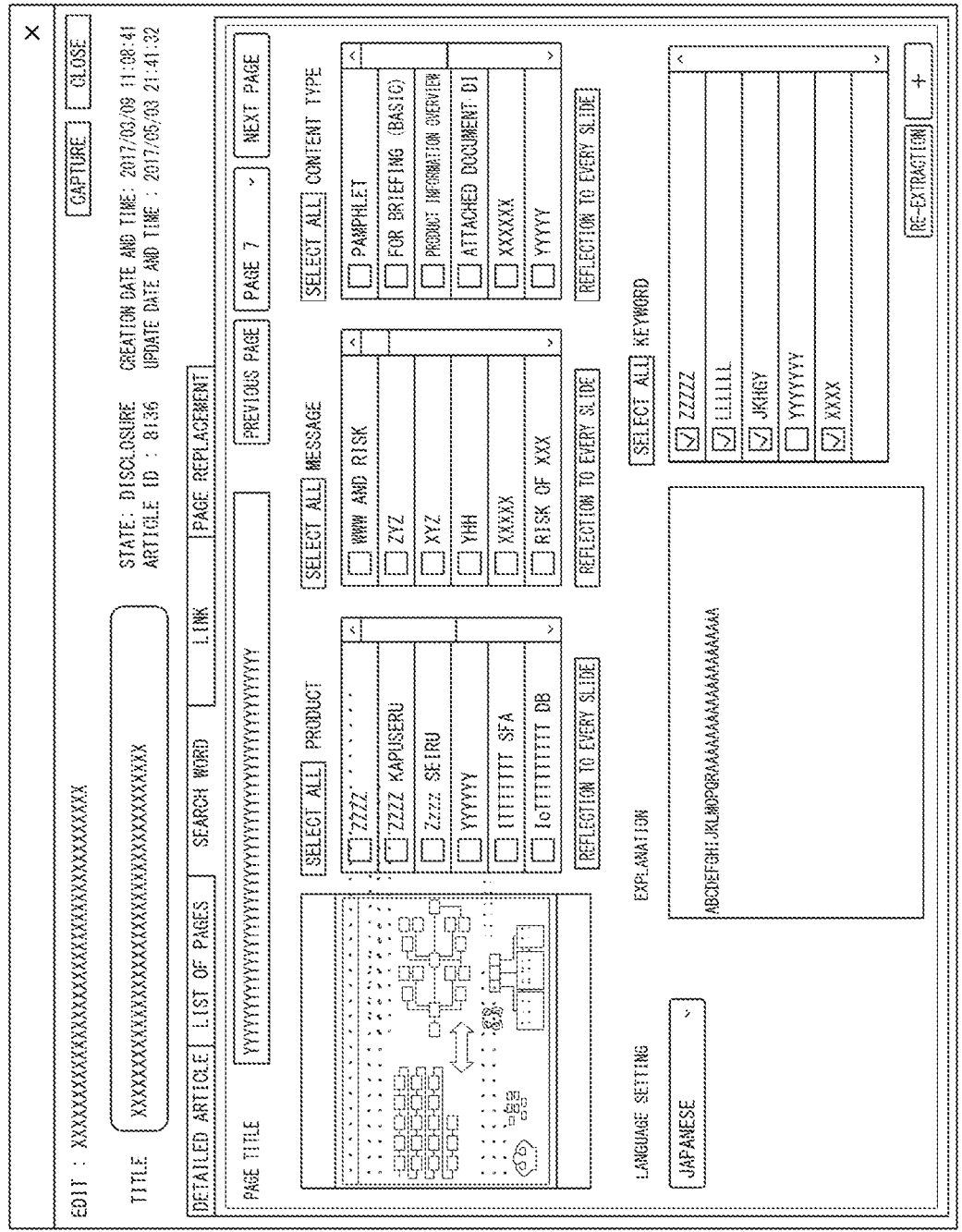
FIG. 9 is an example of a display screen.

FIG. 9 is an example of the display screen. In this example, a certain page of presentation material is displayed at an upper half portion of the display screen. For candidates of search term, an icon for adoption and rejection (checkbox) as well as a candidate of each search term are displayed. Candidates of search term are aligned in the order of category word, topic word, and keyword from left in the example of FIG. 9. Term in material may be also displayed on the display unit. In the example of FIG. 9, a checkbox for adoption is marked for the term extracted by the search term candidate extraction unit 13 as a search term. An authentication button exists at a lower portion of the display screen, and when the user inputs an authentication instruction to the computer (terminal) using the authentication button, candidate of search term is authenticated. The device 1 that has received an input from the computer stores the search terms authenticated (and scores of respective search terms) for a certain page of presentation in the storage unit in an associated manner.

The search term input unit 19 is a unit for receiving an input indicating being a search term among the candidates of search term displayed on the display unit 15. In the example of FIG. 9, an input in a checkbox functions as search term input unit 19. When an input for rejecting a candidate of search term under adoption state is performed by the user, for example, a checkbox for rejection is marked. Upon receiving the rejection input from the checkbox, the device 1 makes the candidate of search term instructed be in rejection state. Then, when the user inputs an authentication instruction to the computer (terminal) using the authentication button, the candidate of search term is rejected. Note that the device 1 may reduce score of candidate of search term rejected (e.g. scored is reduced to half) to store as a search term associated with the above-mentioned page. A checkbox for rejection is marked (or any checkbox is not marked) for the term that has not been extracted as a search term by the search term candidate extraction unit 13. When an input for adapting a candidate of search term under rejection state is performed by the user, for example, a checkbox for adoption is marked. Upon receiving the adoption input from the checkbox, the device 1 makes the candidate of search term instructed be in adoption state. Then, when the user inputs an authentication instruction to the computer (terminal) using the authentication button, the candidate of search term is adopted. That is, the search term is stored in association with a certain page as a search term of the certain page. In this context, because of the search term selected by the user, the search term may be stored in a state where its score is added or multiplied.

Figure 10:
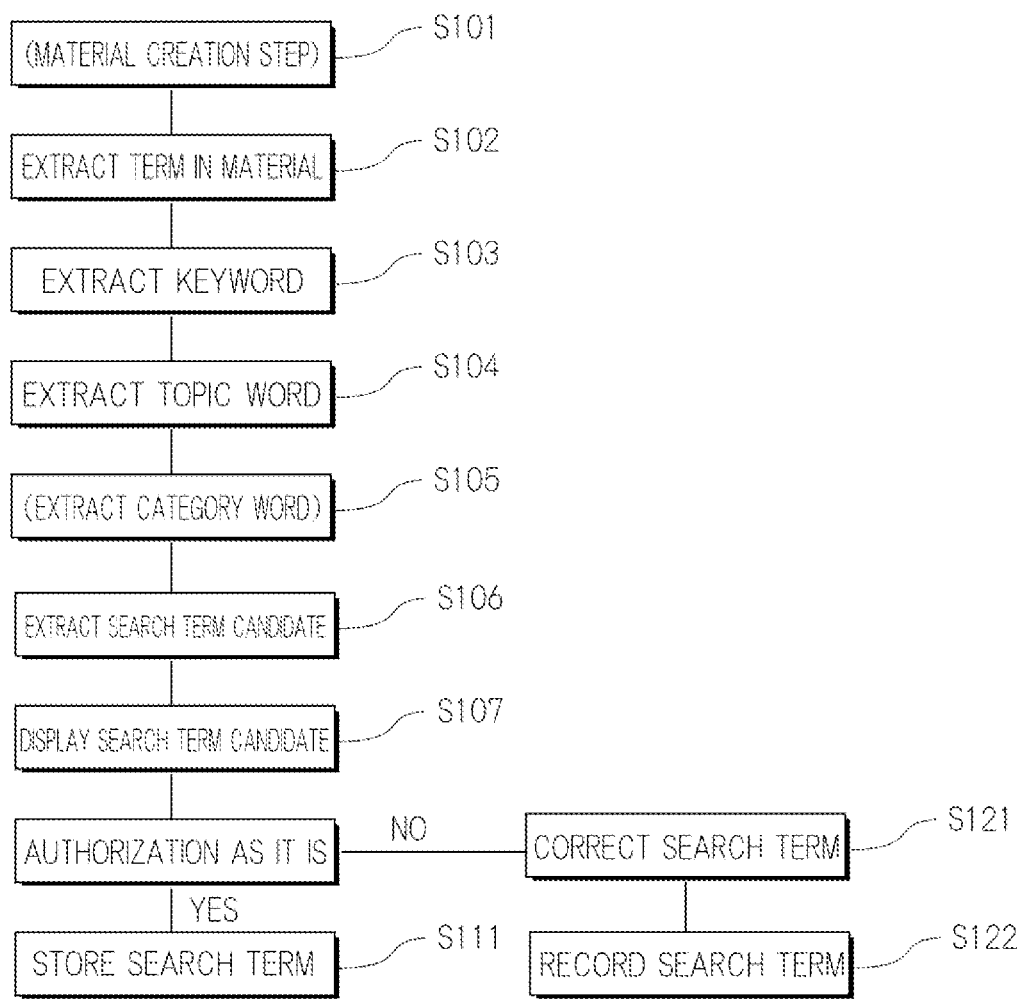
FIG. 10 is a flowchart for illustrating a usage example of a search material information storage device according to the present invention.

FIG. 10 is a flowchart for illustrating a usage example of the search material information storage device of the present invention. That is, FIG. 10 is a diagram for illustrating a search material information storage method using the search material information storage device. S denotes step (process) in the drawing.

The user creates presentation material (S101). The terminal or computer of the user stores presentation material in the storage unit (or the storage unit of the server).

The device 1, for each page of presentation material, extracts a term in material that is a term included in the page (S102). In this context, the device 1 may apply a score to the term in material. For example, when appearance frequency of the term in material is high, or when the term in material is bold letter, colored character, or accompanied by animation or the like, an additional point may be preliminarily registered to apply a score to the term in material using the additional point information registered. Also, the device 1 may have a dictionary of term in material, term in material and score may be stored in an associated manner for various terms in material in the dictionary, and the device 1 may read out score of term in material. In addition, score of term in material may be obtained using score of term in material existing in the dictionary and score related to the additional point (e.g., by addition or multiplication). In this case, when the number of terms in material is preliminarily set, the term in material having a high score may be determined as a term in material.

Using one or the plurality of terms in material extracted, the device 1 extracts a plurality of keywords associated with the one or the plurality of terms in material from the storage unit (S103). A term that becomes a keyword associated with term in material is recorded in the storage unit. Accordingly, the device 1 can extracts a keyword associated with a term in material from the storage unit by using the term in material. In this context, a score as a search term may be applied for each keyword. When the same keyword is selected from different terms in material, the possibility is high that the keyword becomes a search term, so that the keyword may be a target of additional point. In this case, additional point related to high frequency of keyword may be registered and additional point in accordance with duplicate count of keyword may be read out for addition or multiplication with score. In this manner, a plurality of keywords (and scores of the respective keywords) can be obtained.

When the device 1, using a plurality of keywords, extracts a topic word associated with the keywords from the storage unit (S104), the processing is similar to the extraction step of keyword.

The device 1 may extract a category word associated with a topic word from the storage unit using the topic word extracted (S105). This step is an optional step.

The device 1 extracts a candidate of search term of a certain page of material from among a topic word and a plurality of keywords (and the category word) (S106). The device 1 is sufficient to preliminarily store a control command for extracting candidate of search term, and extract candidate of search term of a certain page of material from among the topic word, the plurality of keywords (and the category word) in accordance with the control command. An example of the control command is to extract four keywords having high score from among the plurality of keywords, two topic words having high score among topic words (and every category word) as candidates of search term. In this manner, a candidate of search term for a certain page of presentation material is automatically extracted. Note that, the storage unit may store the candidate of search term extracted as a search term of the certain page.

Next, when the search term is made to be authenticated or determined by the user, the candidate of search term extracted may be made to be displayed on the display unit by the device 1 (S107). In this context, a target page of presentation (reduced in size) and a topic word and a plurality of keywords (and category word) that have not been determined as candidates of search term may be displayed together on the display unit. In this case, the user is able to select search term.

When an authentication is made by the user as it is, the terminal receives an input related to the authentication, and the candidate of search term extracted by the device 1 is stored in the storage unit as search term associated with a certain page of presentation material as it is (S111).

In contrast, when the terminal receives an input indicating that candidate of search term is rejected, or when the terminal receives an input indicating that a term other than candidate of search term is adopted, a candidate of search term reflecting correction of the cases is determined as a search term associated with the certain page in the storage unit (S121).

When an authentication is made by the user after performing the above-mentioned correction, the terminal receives an input related to the authentication, and a candidate of search term corrected is stored in the storage unit as a search term associated with the certain page of presentation material (S122).

The present invention also provides a program for search material information storage and a computer readable recording medium that stores the program, the program causing a computer to function as a term extraction unit 3 that extracts a term in material that is a term included in a certain page of material, a keyword storage unit 5 that stores a term that becomes a keyword associated with the term in material, a keyword extraction unit 7 that extracts a plurality of keywords that become a keyword associated with the term in material from the keyword storage unit 5 using the term in material extracted by the term extraction unit 3, a topic word storage unit 9 that stores a topic word associated with the key word, a topic word extraction unit 11 that, using the plurality of keywords extracted by the keyword extraction unit 7, extracts the topic word associated with the keywords from the topic word storage unit 9, a search term candidate extraction unit 13 that extracts a candidate of search term of a certain page of the material from the topic word extracted by the topic word extraction unit 11 and the plurality of keywords extracted by the keyword extraction unit 7, a search term candidate display unit 17 that makes a display unit 15 display the candidate of search term extracted by the search term candidate extraction unit 13, a search term input unit 19 that receives an input indicating being a search term among candidates of search term displayed on the display unit 15, and a material search information storage unit 21 that stores the search term input by the search term input unit 19 and information related to the certain page of the material in an associated manner.

Figure 11:
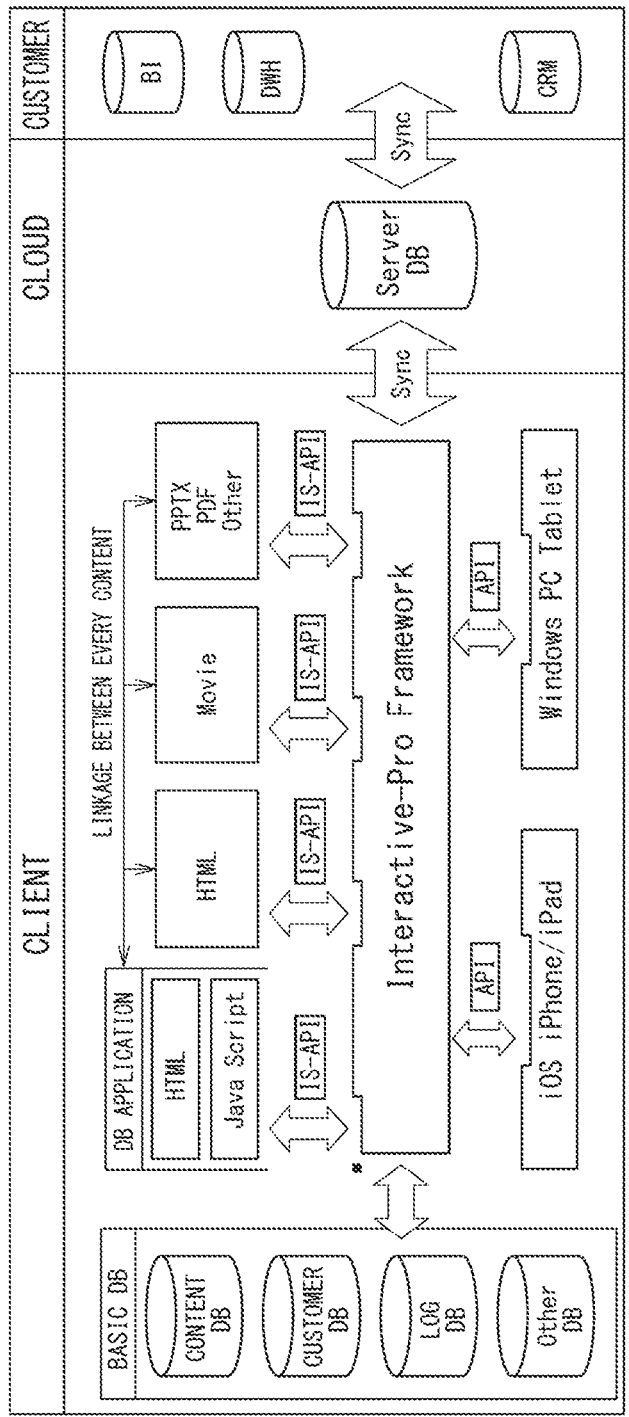
FIG. 11 is a conceptual diagram for illustrating a usage example of the search material information storage device according to the present invention.

FIG. 11 is a conceptual diagram (block diagram) for illustrating a usage example of the search material information storage device according to the present invention. This example includes a content DB, a customer DB, a log DB, and a DB storing other information as a basic database (DB). The databases are connected with an engine called Interactive-Pro Framework via an interface. The engine is configured to be able to receive and transmit information from and to various types of terminals (e.g., PC tablet, mobile terminal, mobile phone) via an API (application programming interface). The engine is also configured to receive and transmit information from and to a control program, an application, HTML, data, movie data, PowerPoint data, PDF data, document data, and database management software, which are in client. The engine is also configured to be synchronized with the server (cloud) to be able to receive and transmit information. In contrast, in the example of FIG. 11, transmission and reception of information are made possible to and from various databases including business Intelligence (BI), customer relationship management (CRM), and data warehouse (DWH) of customer, and software via the server.

The present invention also provides
a program and a computer readable information recording medium that stores such a program, the program causing a computer to function as the display device including
a voice recognition unit 53 that performs voice recognition,
a conversation-derived term extraction unit 55 that extracts a plurality of conversation-derived terms from conversation information recognized by the voice recognition unit 53,
a search keyword storage unit 57 that stores conversation-derived term and search keyword in an associated manner,
a search keyword extraction unit 59 that extracts a plurality of search keywords from the search keyword storage unit 57 using the plurality of conversation-derived terms extracted by the conversation-derived term extraction unit 55,
a material storage unit 61 that stores each page of a plurality of presentation materials, a search term of each page, and a score of the search term in an associated manner,
a relevant page information extraction unit 63 that, using a search keyword extracted by the search keyword extraction unit 59 as the search term, extracts a page of presentation material associated with the search keyword from the material storage unit 59,
a selection term extraction unit 65 that extracts the search keyword as a selection term for selecting a slide when the page of presentation material extracted by the relevant page information extraction unit 63 exists, and
a selection term display unit 71 that causes the selection term extracted by the selection term extraction unit 65 to be displayed on a display unit 69, whereby
the selection term is displayed on the display unit 69.

INDUSTRIAL APPLICABILITY

The present invention is usable in display terminal industry, information and telecommunications industry, software development, pharmaceutical industry, financial industry, and the like.

REFERENCE SIGNS LIST

1 search material information storage device
3 term extraction unit
5 keyword storage unit
7 keyword extraction unit
9 topic word storage unit
11 topic word extraction unit
13 search term candidate extraction unit
15 display unit
17 search term candidate display unit
19 search term input unit
21 material search information storage unit
23 search material information storage device
25 category word storage unit
27 category word extraction unit
53 voice recognition unit
55 conversation-derived term extraction unit
57 search keyword storage unit
59 search keyword extraction unit
61 material storage unit
63 relevant page information extraction unit
65 selection term extraction unit
69 display unit
71 selection term display unit

The invention claimed is:
1. A display device comprising:
a voice recognition unit (53) that performs voice recognition;
a conversation-derived term extraction unit (55) that extracts a plurality of conversation-derived terms from conversation information recognized by the voice recognition unit (53);
a search keyword storage (57), which is a hardware, that stores the plurality of conversation-derived terms and search keyword in an associated manner, and for each specific conversation-derived term of the plurality of conversation-derived terms, stores a coefficient corresponding to a change of voice, an increase or a decrease of volume, or a change of wavelength of voice in association with the specific conversation-derived term, the coefficient being retrieved based on the specific conversation-derived term when the information related to the conversation is analyzed;
a search keyword extraction unit (59) that extracts a plurality of search keywords from the search keyword storage (57) using the plurality of conversation-derived terms extracted by the conversation-derived term extraction unit (55), wherein the search keywords are weighted using the coefficient stored in association with the conversation-derived term;
a material storage unit (61) that stores each page of a plurality of presentation materials, a search term of each page, and a score of the search term in an associated manner;
a relevant page information extraction unit (63) that, using the plurality of search keywords extracted by the search keyword extraction unit (59) as the search term, extracts a page of presentation material associated with the search keyword from the material storage unit (61) based on the weighted search keywords and the score of the search term;
a selection term extraction unit (65) that extracts the search keywords, each of the search keywords being extracted as a selection term for selecting a certain page of presentation material when the page of presentation material extracted by the relevant page information extraction unit (63) exists;
a selection term display unit (71) that causes the selection terms for selecting a certain page of presentation material extracted by the selection term extraction unit (65) to be displayed on a display unit (69), the display unit (69) being a display screen of a terminal;
a selection term input unit (75) that receives information indicating that the selection term displayed is selected;

a page candidate read out unit (77) that, using the selection term input by the selection term input unit (75), reads out the page candidate of the plurality of presentation materials associated with the selection term; and a page selection information input unit (79) that receives information indicating that a page of specific presentation material is selected from among page candidates of the plurality of presentation materials read out by the page candidate read out unit (77), wherein the page of presentation material selected is displayed on the display unit (69) using information related to the page of presentation material selected by the page selection information input unit (79), wherein in a case where the display device receives a command to reject a candidate of the search term, the display device reduces the score of the search term.

2. The display device according to claim 1, wherein the page of presentation material is associated with the search keyword having high score.

3. The display device according to claim 1, wherein the selection term display unit (71) causes the selection term extracted by the selection term extraction unit (65) to be displayed in a selection term display area (73) existing at a lower portion of the display screen.

4. The display device according to claim 1 further comprising a search material information storage device (23) including a term extraction unit (3) that extracts a term in material that is a term included in a certain page of material, a keyword storage unit (5) that stores a term that becomes a keyword associated with the term in material, a keyword extraction unit (7) that extracts a plurality of keywords that become a keyword associated with the term in material from the keyword storage unit (5) using the term in material extracted by the term extraction unit (3), a topic word storage unit (9) that stores a topic word associated with the key word, a topic word extraction unit (11) that, using the plurality of keywords extracted by the keyword extraction unit (7), extracts the topic word associated with the keywords from the topic word storage unit (9), a search term candidate extraction unit (13) that extracts a candidate of search term of a certain page of the material from the topic word extracted by the topic word extraction unit (11) and the plurality of keywords extracted by the keyword extraction unit (7), a search term candidate display unit (17) that makes a display unit (15) display the candidate of search term extracted by the search term candidate extraction unit (13), a search term input unit (19) that receives an input indicating being a search term among candidates of search term displayed on the display unit (15), and a material search information storage unit (21) that stores the search term input by the search term input unit (19) and information related to the certain page of the material in an associated manner.

5. A computer readable non-transitory recording medium that records a program, the program causing a computer to function as a display device, the display device including a voice recognition unit (53) that performs voice recognition;

a conversation-derived term extraction unit (55) that extracts a plurality of conversation-derived terms from conversation information recognized by the voice recognition unit (53);

a search keyword storage unit (57) that stores conversation-derived term and search keyword in an associated manner, and for each specific conversation-derived term, stores a coefficient corresponding to a change of voice, an increase or a decrease of volume, or a change of wavelength of voice in association with the specific conversation-derived term, the coefficient being retrieved based on the specific conversation-derived term when the information related to the conversation is analyzed;

a search keyword extraction unit (59) that extracts a plurality of search keywords from the search keyword storage unit (57) using the plurality of conversation-derived terms extracted by the conversation-derived term extraction unit (55), wherein the search keywords are weighted using the coefficient stored in association with the conversation-derived term;

a material storage unit (61) that stores each page of a plurality of presentation materials, a search term of each page, and a score of the search term in an associated manner;

a relevant page information extraction unit (63) that, using the plurality of search keywords extracted by the search keyword extraction unit (59) as the search term, extracts a page of presentation material associated with the search keyword from the material storage unit (61) based on the weighted search keywords and the score of the search term;

a selection term extraction unit (65) that extracts the search keywords, each of the search keywords being extracted as a selection term for selecting a slide when the page of presentation material extracted by the relevant page information extraction unit (63) exists;

a selection term display unit (71) that causes the selection terms for selecting a certain page of presentation material extracted by the selection term extraction unit (65) to be displayed on a display unit (69), whereby the selection terms are displayed on the display unit (69);

a selection term input unit (75) that receives information indicating that the selection term displayed is selected;

a page candidate read out unit (77) that, using the selection term input by the selection term input unit (75), reads out the page candidate of the plurality of presentation materials associated with the selection term; and a page selection information input unit (79) that receives information indicating that a page of specific presentation material is selected from among page candidates of the plurality of presentation materials read out by the page candidate read out unit (77), wherein the page of presentation material selected is displayed on the display unit (69) using information related to the page of presentation material selected by the page selection information input unit (79), wherein in a case where the display device receives a command to reject a candidate of the search term, the display device reduces the score of the search term.

6. The display device according to claim 1, wherein when appearance frequency of the conversation-derived term in the presentation material is high, or when the conversation-derived term in the presentation material is bold letter, colored character, or accompanied by animation, an additional point is preliminarily registered to apply a score to the conversation-derived term in the presentation material using the additional point information registered.

7. The computer readable non-transitory recording medium according to claim 5, wherein when appearance frequency of the conversation-derived term in the presentation material is high, or when the conversation-derived term in the presentation material is bold letter, colored character, or accompanied by animation, an additional point is preliminarily registered to apply a score to the conversation-derived term in the presentation material using the additional point information registered.

\* \* \* \* \*